United States Patent [19]

Maida

[11] 4,190,340
[45] Feb. 26, 1980

[54] MOTOR DRIVE APPARATUS FOR PHOTOGRAPHIC CAMERA

[75] Inventor: Osamu Maida, Tokyo, Japan

[73] Assignee: Nippon Kogaku K.K., Tokyo, Japan

[21] Appl. No.: 847,920

[22] Filed: Nov. 2, 1977

[30] Foreign Application Priority Data

Nov. 5, 1976 [JP] Japan .............................. 51/132312

[51] Int. Cl.² .............................................. G03B 1/18
[52] U.S. Cl. .................................................... 354/173
[58] Field of Search ............... 354/173, 170, 171, 204, 354/212

[56] References Cited

U.S. PATENT DOCUMENTS

| | | | |
|---|---|---|---|
| 3,813,681 | 5/1974 | Sahara | 354/173 |
| 4,086,603 | 4/1978 | Kozuki et al. | 354/173 X |

Primary Examiner—Michael L. Gellner

Attorney, Agent, or Firm—Fitzpatrick, Cella, Harper & Scinto

[57] ABSTRACT

A motor drive apparatus comprises phase switches adapted to assume a first state upon shutter release of a camera, to cause the film advancement to be started upon receipt of an exposure completion signal from the camera in the first state and to assume a second state upon completion of the film advancement to enable succeeding shutter release. A timer circuit is adapted to start counting time upon receipt of the exposure completion signal from the camera and to release a timer signal upon completion of counting after the lapse of a predetermined period. Release apparatus is adapted to generate a release signal during the second state of the phase switches and upon release of the timer signal from the timer circuit thereby causing the shutter release of camera to be started. The motor drive apparatus can avoid the influence of variation in the film advancing period in continuous photographing and achieve an always constant actual interval.

8 Claims, 9 Drawing Figures

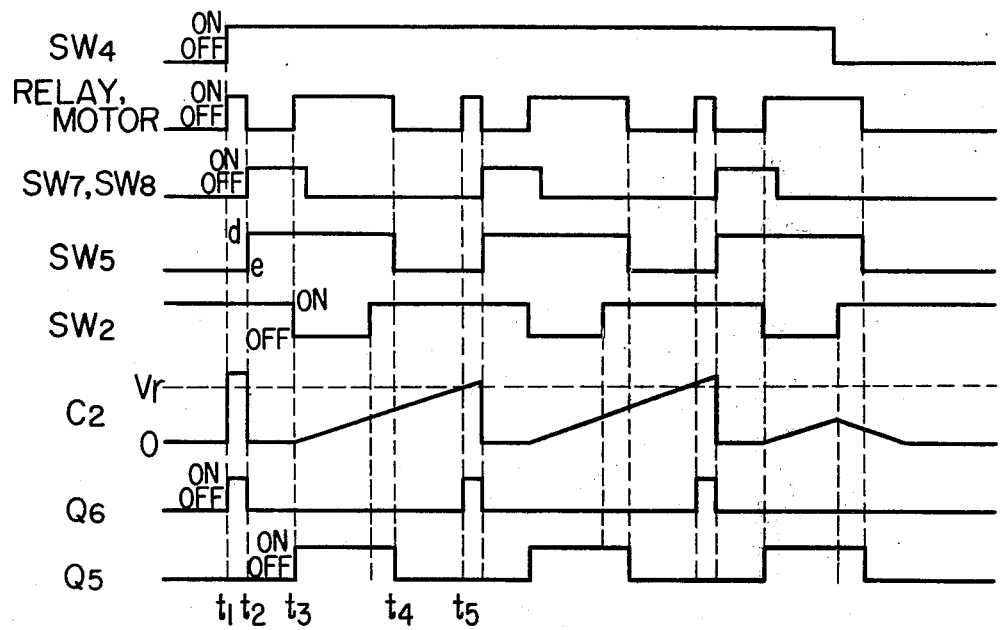
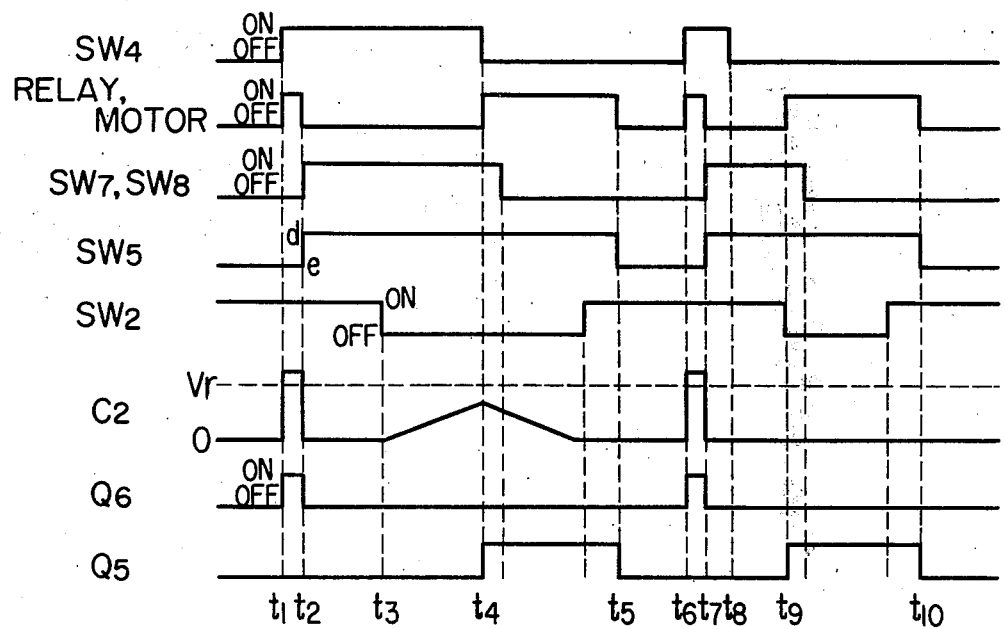

MOTOR DRIVE APPARATUS FOR PHOTOGRAPHIC CAMERA

BACKGROUND OF THE INVENTION

1. Field of the Invention

This invention relates to a control apparatus for a photographic camera wherein a motor drive device performs the film advancement, shutter charging and shutter release to enable electrically driven photographing.

2. Description of the Prior Art

In conventional motor drive apparatus, an interval for determining the rate of continuous photographing is provided between the shutter release and the start of film advancement. In such apparatus, however, the interval from the completion of exposure of a frame to the start of exposure of a succeeding frame in continuous photographing (hereinafter called "actual interval") is equal to the sum of the above-mentioned interval and the period from the start of film advancement to the start of exposure of the succeeding frame. In ordinary motor drive apparatus wherein the drive motor is not controlled at a fixed speed, the period required for film advancement is subject to variation in the power supply voltage or in the film advancing torque, and the actual interval is significantly affected by the variation of the film advancing period if it occupies a major portion in said actual interval. For this reason an accurate actual interval cannot be expected in such motor drive apparatus.

SUMMARY OF THE INVENTION

An object of the present invention, therefore, is to provide a control apparatus for a photographic camera provided with a motor drive device eliminating the above-mentioned drawbacks and avoiding the influence of variation in the film advancing period in continuous photographing thereby allowing a constant actual interval.

An another object of the present invention is to provide a control apparatus for a photographic camera provided with a motor drive device eliminating the above-mentioned drawbacks and allowing selection of various photographing modes.

BRIEF DESCRIPTION OF THE DRAWINGS

The invention will be further described with reference to the accompanying drawings, which illustrate preferred and exemplary embodiments and wherein:

FIGS. 2–5 are time charts illustrating the function of embodiment shown in FIG. 1.

DESCRIPTION OF THE PREFERRED EMBODIMENT

Figure 1:
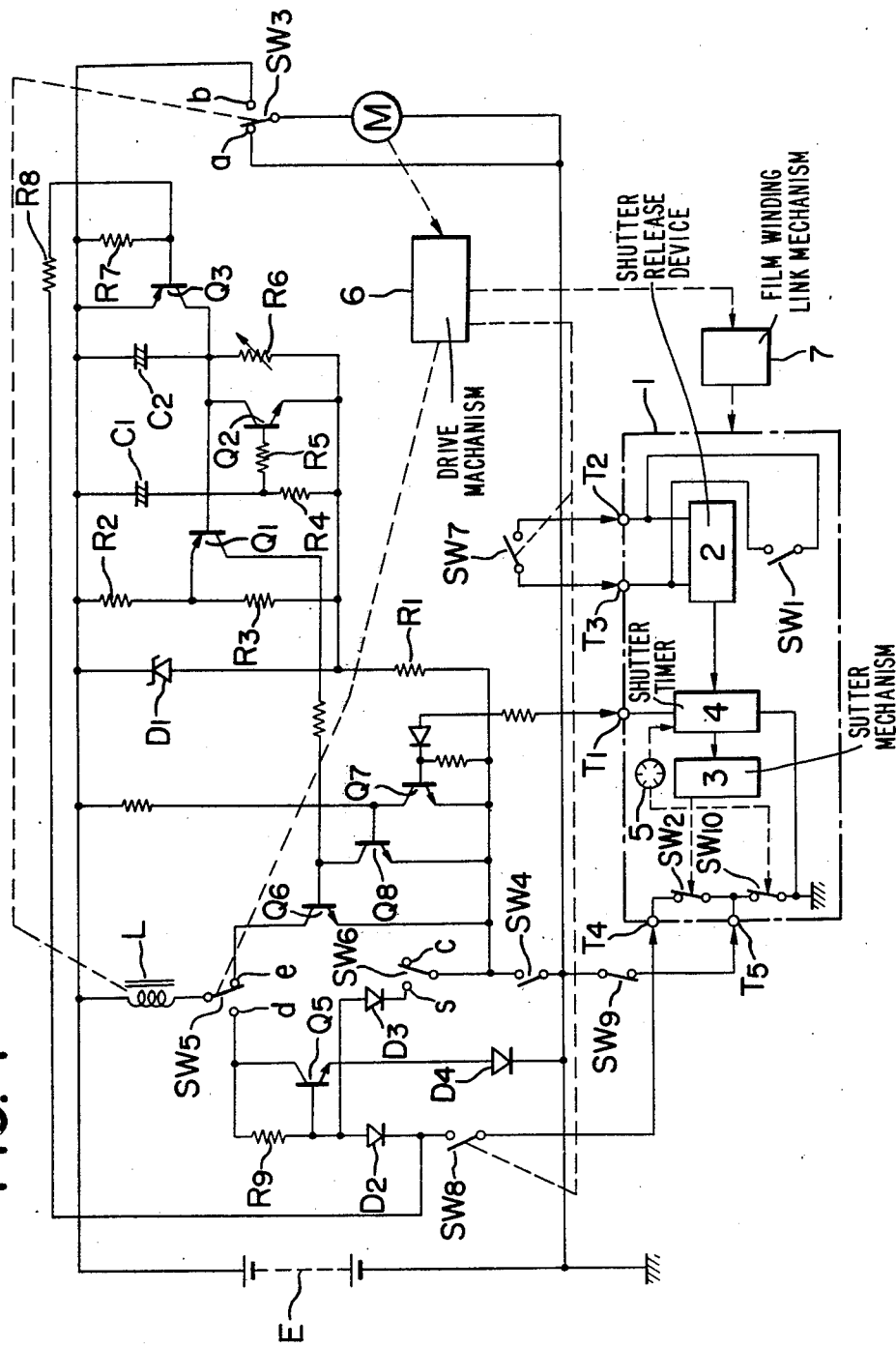
FIG. 1 is a circuit embodying the present invention.

Now the present invention will be explained in detail with respect to the preferred embodiments thereof. In the following embodiments the camera and the motor drive apparatus are supposed to be mutually detachable, but the present invention will not be limited to such particular form of embodiment. In FIG. 1 illustrating a first embodiment of the present invention, a block indicates the circuitry on the camera side. Upon closure of a release switch SW1 connected with the shutter button on the camera, an electromagnetic release device 2 actuates a shutter mechanism 3 through a shutter time control device 4 to initiate the exposure. The shutter time control device 4 determines the exposure time according to the setting of a shutter dial 5. The camera is designed to allow selection of exposures, according to the setting of the shutter dial 5, for example automatic exposure by an electronic shutter followed diaphragm opening, manual bulb exposure or manual bulb exposure or manually selected exposure time. An exposure completion switch SW2 is turned OFF upon closure of the shutter and thus completion of exposure to generate an exposure completion signal and is turned ON just before the completion of shutter charging. A first sequence selecting switch SW10 on the camera side is adapted to be turned ON or OFF in combination with a selecting switch SW6 and a second sequence selecting switch SW9 of the motor drive apparatus to enable various operating modes in combination with the motor drive apparatus as will be explained later.

The first sequence selecting switch SW10 is turned ON when an automatic exposure followed diaphragm opening or a manually selected slow shutter speed (for example an exposure of 1/60 sec. or is selected by the shutter dial 5, and is turned OFF when a manually selected fast shutter speed (for example an exposure of 1/25 sec. or a bulb exposure is selected.

The electric connections between the camera and the motor drive apparatus are achieved through the contacts T1 to T5 and through the contact between the camera body and the body of motor drive apparatus. The rotation of a motor M, which is controlled by means of a switch SW3, is transmitted to a known drive mechanism 6, which in turn controls shutter charging and film advancing mechanisms (not shown) of the camera through a film winding link mechanism 7. The switch SW3 cooperates with a relay coil L and assumes the position b or a respectively when said relay coil L is energized or not. A trigger switch SW4 is turned ON upon actuation of a trigger button (not shown) of the motor drive apparatus to cause a predetermined photographing operation of the apparatus to be initiated. A resistor R1 and a Zener diode D1 connected in series between the terminals of the power source upon closure of the trigger switch SW4 constitute a voltage stabilizing circuit for the timer circuit which will be explained later.

A capacitor C1, resistors R4 and R5 and a transistor Q2 constitute a start circuit wherein the transistor Q2 is rendered conductive to shortcircuit a resistor R6 only during an instant of the closure of the trigger switch SW4. Also a timer circuit is composed of a capacitor C2, resistors R2, R3, R6, R7 and R8, transistors Q1 and Q3.

The resistor R6 is variable to adjust the required timer period. Upon lapse of a predetermined timer period, a circuit interconnection from the timer capacitor C2 to the base of the transistor Q1 causes that element to be rendered conductive to generate a timer signal. A phase switch SW5 which is controlled by the drive mechanism 6 is changed over to the terminal d upon completion of shutter release and to the terminal e upon completion of film advancement. A selecting switch SW6 is provided to select single-frame photographing or continuous photographing at the position s or c, respectively. A transistor Q6 controls the current through the relay coil L when the phase switch SW5 is in the terminal position e. Transistors Q8, Q7, and resistors and a diode connected thereto constitute a circuit for stopping the function of the motor drive apparatus. When the camera 1 is in a state allowing photograph taking, there is provided at the terminal T1 a potential or a normal photographing signal, which can shift the transistor Q7 to conductive state. Therefore, when the camera 1 is in a state allowing photographing operation, the transistor Q7 is made conductive by means of the potential to shift the transistor Q8 to non-conductive state. As the result the transistor Q6 is controlled according to the ON or OFF state of the transistor Q1 to allow photographing by means of the motor drive apparatus. When the camera 1 is in a state not allowing the photographing operation, for example if photographing by automatic exposure mechanism is not feasible, if the power switch on the camera is not turned on, if the power voltage on the camera is outside a predetermined range or if frames of a predetermined number are already exposed, there will not be provided at the terminal T1 a potential allowing the transistor Q7 to be turned on, which therefore remains in non-conductive state even when the trigger switch SW4 is closed. Consequently the transistor Q8 is in a conductive state to retain the transistor Q6 in non-conductive state thereby suspending the function of the motor drive apparatus. A switch SW7 connected in parallel with the release switch SW1 of the camera through the terminals T2 and T3 and a switch SW8 connected in series with the exposure completion switch SW2 through the terminal T4 are turned on and off in approximate synchronization. These switches SW7, SW8 are turned ON by the drive mechanism 6 upon closure of the trigger switch SW4 and subsequent rotation of motor M, and turned OFF at the film advancement by the motor M through the drive mechanism 6 after the completion of exposure. Upon closure of the switch SW7 the electromagnetic release device 2 causes the exposure to be initiated. A second sequence selecting switch SW9 provided on the motor drive apparatus and connected in parallel with said first sequence selecting switch SW10 through the terminal T5 is turned on or off according to the selected operation mode. The details of the circuit shown in FIG. 1 and explained in the foregoing will be further clarified through the explanation of function thereof.

Now there will be given an explanation on the function of the present embodiment. FIG. 1 illustrates a state wherein the function of camera and motor drive apparatus is suspended after a film advancement.

In a first operating mode the selecting switch SW6 is positioned at the terminal c, representing the continuous photographing mode selected by the motor drive apparatus, and the second sequence selecting switch SW9 is in ON state allowing the transmission of the signal from the exposure completion switch SW2 to the motor drive apparatus. On the camera any photographing mode other than bulb exposure may be arbitrarily selected. In this state a normal photographing signal is provided to the terminal T1 since the camera is in a state allowing photographing operation. Now, upon closing the trigger switch SW4 to start the photographing, the potential of the connecting point between the condenser C1 and resistor R4 becomes instantaneously equal to the source voltage to shift the transistor Q2 to conductive state for an instant, thereby shortcircuiting the resistor R6. Also the base of transistor Q1 assumes same potential as that of the connecting point between the Zener diode D1 and resistor R1 to render the transistor Q1 instantaneously conductive regardless of the resistor R6, thereby shifting the transistor Q6 to conductive state. In this state the phase switch SW5 is in the terminal position e because the shutter release has not yet occurred. Consequently a current is supplied through the phase switch SW5 to the relay coil L to change over the switch SW3 to the terminal b, thus supplying current to the motor M. The motor rotation, through the drive mechanism 6, closes the switches SW7 and SW8 to perform the shutter release of the camera 1. Simultaneously the phase switch SW5 is changed over from the terminal e to d, whereby the transistor Q5 is maintained in OFF state until the exposure completion switch SW2 is turned OFF, thus interrupting the current in the relay coil L. As the result, the switch SW3 returns to the position a, thus rapidly stopping the motor M by electromagnetic braking. Also, upon turning on of the switch SW8 the transistor Q3 is turned on through said switch SW8, exposure completion switch SW2 and second sequence selecting switch SW9 to discharge the capacitor C1, thereby shifting the transistor Q1 to non-conductive state and resetting the timer circuit. Subsequently, upon completion of exposure of the camera 1, the exposure completion switch SW2 is turned off to shift the transistor Q5 to conductive state, thus allowing current supply to the relay coil L. As the result the switch SW3 is changed over the terminal position b to initiate the rotation of motor M for film advancement. In this state since the transistor Q2 is in OFF state and also since the transistor Q3 is also in OFF state due to the turning off of the exposure completion switch SW2, the capacitor C2 initiates charging through the resistor R6, thus starting the time counting function of the timer circuit. The rotation of motor M is transmitted, through the drive mechanism 6 and winding link mechanism 7, to the shutter charging and film advancing mechanisms (not shown) of the camera to perform shutter charging and film advancement. Also the switches SW7 and SW8 are turned OFF before the shutter charging and turning on of the exposure completion switch SW2 by the drive mechanism 6. Upon completion of the film advancement the phase switch SW5 is changed over from the terminal position d to e. The length of the time period from the turning OFF of the transistor Q3 at the completion of exposure (when the switch SW2 is turned OFF) to the turning ON of the transistor Q1 by the charging of capacitor C1 through the resistor R6 can be arbitrarily selected by the magnitude of the resistor R6, and such period is selected at a value greater than the maximum period required for film advancement, namely the film advancing period required at the lowest voltage in the usable power voltage range (for example ca. 0.3 sec.). In such state, if the trigger switch SW4 continues to be actuated after the phase switch SW5 is changed over from the terminal position d to e, the transistor Q6 remains in OFF state until the transistor Q1 is turned ON, and the relay coil L is therefore not energized to cause the changeover of the switch SW3 to the position a, thus stopping the motor M by electromagnetic braking. Subsequently, shutter release is attained by means of the invention as follows: a release circuit, including transistor Q1, having its emitter coupled to the voltage divider R2, R3, and a transistor Q6, is energized, wherein the transistor Q1 is turned ON, and also the transistor Q6 is turned ON upon generation of a timer signal from the timer circuit. The transistor Q6 generates a release signal to energize the relay coil L thereby causing the rotation of motor M and closing the switch SW7 through the drive mechanism 6. Thus the camera shutter is released again. The above-explained function is repeated by the motor drive apparatus as long as the trigger switch SW4 is actuated, thereby achieving continuous photographing. Upon opening of said trigger switch SW4 the function is terminated at the state after the film advancement shown in FIG. 1. The function in the above-mentioned first operation mode is illustrated in the time chart of FIG. 2.

In FIG. 2 illustrating functions of various components versus time, t1 represents the time of start of function of the motor drive apparatus upon closure of the trigger switch SW4, t2 the time of start of release of camera shutter, t3 the time of exposure completion and start of film advancement, t4 the time of completion of film advancement, and t5 the time of generation of timer signal or start of succeeding shutter release. Thus the actual interval or the length of period from the completion of an exposure to the start of next shutter release is solely determined by the timer circuit and is not affected by the period required for film advancement which is subject to the variation of source voltage, as long as the timer period is selected to be longer than the maximum period required for film advancement.

Now there will be given an explanation of a case wherein the selecting switch SW6 is in the terminal position c and the second sequence selecting switch SW9 is in the OFF position. In this state, the function of the motor drive apparatus is dependent on the photographing mode selected on the camera 1. In case an automatic exposure or a manually selected slow shutter speed (for example and exposure of 1/60 sec. or slower) is selected by the shutter dial 5, the first sequence selecting switch SW10 is positioned in the ON state, and the function of the motor drive apparatus is same as that in the aforementioned first operating mode wherein the second sequence selecting switch SW9 is in the ON position. On the other hand, a second operating mode is conducted when a high shutter speed (for example an exposure of 1/125 sec. or faster) is manually selected by means of the shutter dial 5. In this mode the signal of exposure completion switch SW2 is not transmitted to the motor drive apparatus since the first sequence selecting switch SW10 is in the OFF position. Upon closure of the trigger switch SW4, the transistor Q2 is rendered conductive as explained before to apply a bias voltage to the base of transistor Q1 which is thus rendered instantly conductive thereby further shifting the transistor Q6 to the conductive state and causing the rotation of motor M. As the result the camera shutter is released and the phase switch SW5 is changed over from the terminal e to d. In the above-explained first operating mode, since the second sequence selecting switch SW9 is in the ON position, the ON/OFF signal of the exposure completion switch SW2 in the state is transmitted through the switch SW8 to the transistor Q5 thereby holding the transistor Q5 in the non-conductive state and arresting the rotation of motor M until the exposure is completed. However, in the present second operating mode wherein the first and second sequence selecting switches SW9, SW10 are both in the OFF position, the ON signal from the exposure completion switch SW2 is not transmitted to the transistor Q5. Consequently the transistor Q5 is always in the conductive state while the phase switch SW5 is in the terminal position d, and thus the motor M continues to rotate after the phase switch SW5 is changed over from the terminal position e to d. Thus, in this mode, the motor drive apparatus intends to start the film advancement simultaneously with the release of camera shutter. There is however provided a certain delay time from the shutter release to the start of actual film advancement by the drive mechanism 6 through the winding link mechanism 7 due to the presence of a certain play provided in the stroke of said drive mechanism 6 and of the film winding mechanism (not shown) in the camera 1. The delay time, being dependent on the revolution of motor M, is minimum when the power source voltage of the motor drive apparatus is maximum within the usable range. The duration from the shutter release to the completion of exposure of the above-mentioned manually selected high shutter speed (for example an exposure of 1/125 sec. or shorter) of the camera 1 is selected so as to be shorter than the minimum delay time. Consequently, even though the motor M continues to rotate after the shutter release, the exposure is completed before the actual start of film advancement, thereby preventing image streaking resulting from eventual film movement during the exposure. The phase switch SW5 is changed over from the terminal d to e upon completion of the exposure and of the film advancement. On the other hand, since the first and second sequence selecting switches SW9, SW10 are both in the OFF position, the transistor Q3 remains in the non-conductive state and the capacitor C1 is therefore not discharged. Thus, the transistor Q1, after being shifted to the conductive state upon closure of the trigger switch SW4, remains in said state as long as the trigger switch SW4 remains thereafter in the closed state, whereby the relay coil L continues to be energized and the motor M continues to rotate even after the phase switch SW5 is shifted to the terminal position e. Consequently the motor drive apparatus again releases the camera shutter and thereafter repeats the above-explained functions to perform continuous photographing until the trigger switch SW4 is turned OFF. In this manner the second operating mode achieves continuous photographing by continuous rotation of motor M for a limited range of high shutter speeds, enabling high-speed continuous photographing though the number of frames exposed per unit time is dependent on the power source voltage.

Figure 4:
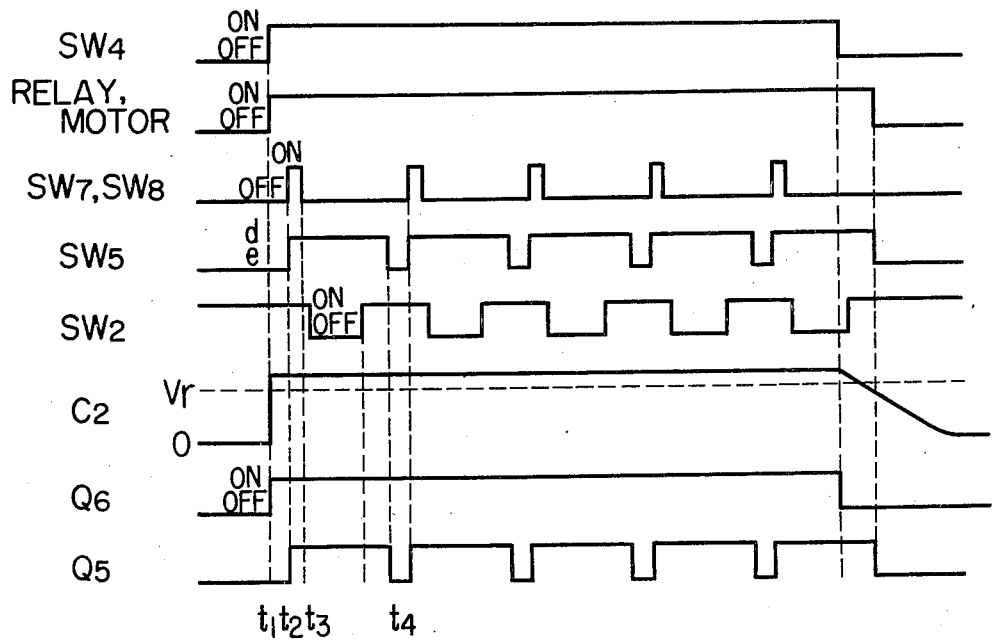

The functions of the above-explained second operating mode is shown in the time chart of FIG. 4, wherein t1 represents the time of closure of trigger switch SW4, t2 the time of start of shutter release, t3 the time of completion of exposure, and t4 the time of completion of film advancement.

Now there will be explained a third operating mode wherein the selecting switch SW6 is in the position s and the second sequence selecting switch SW9 is in the ON position, representing a single-frame photographing mode. In this state the ON, OFF signal of the exposure completion switch SW2 is always transmitted to the motor drive apparatus because of said second sequence selecting switch SW9 in the ON position. In this state any photographing mode other than bulb exposure may be selected on the camera 1. The function of the third operating mode is as follows.

Upon closure of the trigger switch SW4, the transistor Q1 is instantly rendered conductive by the transistor Q2 in the manner explained before to shift the transistor Q6 to the conductive state, thereby initiating the rotation of motor M. Thus the drive mechanism 6 releases the camera shutter and shifts the phase switch SW5 from the terminal e to d. The transistor Q5 is then turned off as the base thereof is connected to the common terminal through the diode D3, selecting switch SW6 and the trigger switch SW4. Also the transistor Q5 is turned off when the exposure completion switch SW2 is in the ON state as the base of said transistor is connected to the negative terminal of the power source through the second sequence selecting switch SW9, the switch SW8 and the exposure completion switch SW2. Consequently the transistor Q5 is maintained in the non-conductive state unless the trigger switch SW4 and the exposure completion switch SW2 are both turned OFF. Thus upon shifting of the phase switch SW5 to the terminal position d, the relay coil L ceases to be energized and the motor M is stopped if the transistor Q5 is in the OFF state. The transistor Q5 is shifted to the conductive state when the trigger switch SW4 is turned off before the completion of exposure because the exposure completion switch SW2 is turned OFF, or when the trigger switch SW4 is turned off after the completion of exposure, thus causing the motor M to rotate and the film to advance. Upon completion of film advancement the phase switch SW5 is changed over to the terminal e to terminate the rotation of motor M as the trigger switch SW4 is then already in the OFF state. Thus, upon reclosure of the trigger switch SW4, the above-explained functions are repeated to perform single-frame photographing. In this manner this third operating mode securely performed single-frame photographing regardless of the timing of turning OFF of the trigger switch SW4.

The functions of the third operating mode are illustrated in the time chart of FIG. 3, wherein t1–t5 represent the functions in case the trigger switch SW4 is turned OFF appropriately after the completion of exposure, t1 representing the time of closure of trigger switch SW4, t2 the time of start of shutter release, t3 the time of completion of exposure, t4 the time of opening of trigger switch SW4, and t5 the time of completion of film advancement; while t6–t10 represent the functions in case the trigger switch SW4 is turned OFF before the completion of exposure, t6 representing the time of the closure of trigger switch SW4, t7 the time of shutter release, t8 the time of opening of trigger switch SW4, t9 the time of completion of exposure, and t10 the time of completion of film advancement.

Now there will be given an explanation on a fourth operating mode wherein the selecting switch SW6 of the motor drive apparatus is positioned at the terminal s and the second sequence selecting switch SW9 is in the OFF position. On the camera the bulb exposure is selected so that the first sequence selecting switch SW10 is, as explained before, in the OFF position. In this operating mode the camera shutter is opened to perform exposure during the ON state of trigger switch SW4, of which turning OFF causes the shutter to be closed to complete the exposure and the film to be advanced.

In this mode, upon closure of the trigger switch SW4, the transistor Q6 is instantly rendered conductive as explained before to cause the motor M to rotate, thereby releasing the camera shutter and shifting the phase switch SW5 from one terminal position e to d. In this state the transistor Q5 is in the OFF state as the base thereof is connected to the negative pole of the power supply through the diode D3, selecting switch SW6 and trigger switch SW4. Consequently the motor M stops upon turning ON of the switch SW7, i.e. after the shutter release. As the bulb exposure is selected on the camera 1, the shutter remains open while the switch SW7 is in the ON state. The closing of the shutter is performed by opening the trigger switch SW4. The ON signal of exposure completion switch SW2 is not transmitted to the motor drive apparatus as the first and second sequence selecting switches SW9, SW10 are positioned in the OFF state, so that the opening of trigger switch SW4 shifts the transistor Q5 to the conductive state thereby causing the rotation of motor M, which however initiates the advancement of film after the closing of shutter due to a certain play provided in the stroke of the drive mechanism 6 and the film winding mechanism (not shown) of camera 1 as explained in the foregoing, thereby preventing the streaking of photographed image. Upon completion of film advancement the phase switch SW5 is changed over to the terminal e whereby the motor stops as the trigger switch SW4 is open in this state. Upon reclosure of the trigger switch SW4 the above-explained functions are repeated to open the shutter while the trigger switch SW4 is in the ON state and to close the shutter upon opening of the switch and thereafter perform the film advancement.

Figure 5:
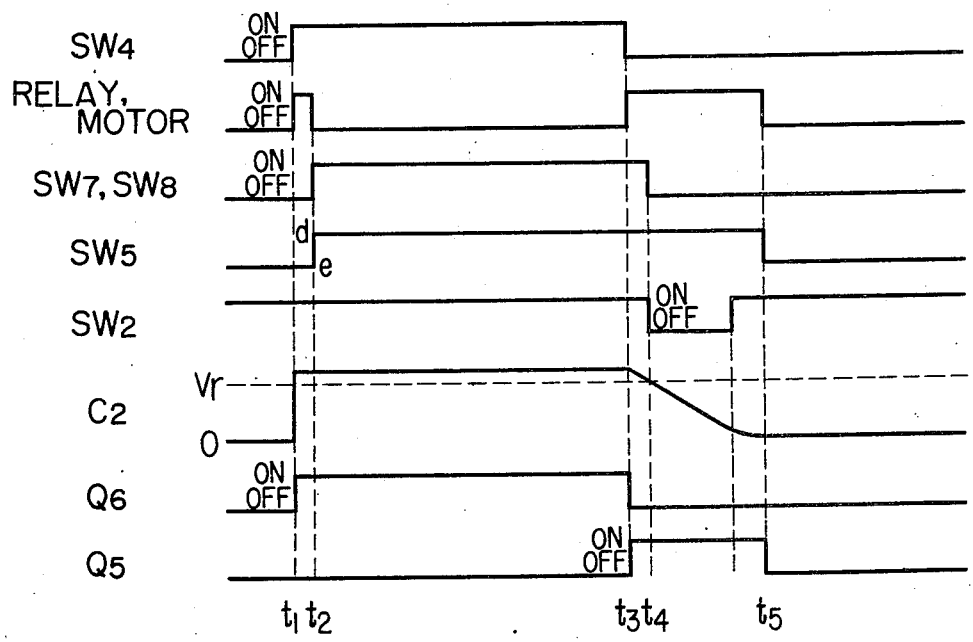

The functions of this fourth operating mode are illustrated in the time chart of FIG. 5 wherein t1 represents the time of closure of trigger switch SW4, t2 the time of start of shutter release, t3 the time of opening the trigger switch SW4, t4 the time of completion of exposure, and t5 the time of completion of film advancement.

In a fifth operating mode the selecting switch SW6 of the motor drive apparatus may be positioned either at the position s or c, but the second sequence selecting switch SW9 is positioned in the ON state. The bulb photographing mode is selected on the camera 1 so that the first sequence selecting switch SW10 is in the OFF state. In this operating mode the camera shutter is opened to perform exposure upon closure of the trigger switch SW4, remains open after the opening of trigger switch SW4 and is closed by turning OFF of the second sequence selecting switch SW9 thereby achieving so-called time exposure, followed by film advancement.

Upon closure of the trigger switch SW4 the motor M is caused to rotate as explained in the foregoing thereby releasing the camera shutter and shifting the phase switch SW5 from the terminal e to d, whereupon the transistor Q5 is rendered non-conductive as the base thereof is connected to the negative pole of the power source through the switch SW8, exposure completion switch SW2 and second sequence selecting switch SW9, thus stopping the motor M in the ON state of switch SW7, i.e. after shutter release. Since bulb exposure is selected on the camera 1, the shutter remains open as long as the switch SW7 is in the ON state. In this state the shutter is maintained open even if the trigger switch SW4 is turned OFF since the transistor Q5 is maintained in the OFF state due to the ON state of the exposure completion switch SW2, thus maintaining the motor M in standstill. The shutter closing is achieved by turning OFF of the second sequence selecting switch SW9, whereby the transistor Q5 is rendered conductive to cause the rotation of motor M which opens the switches SW7, SW8 to close the shutter and also performs the film advancement. Upon completion of film advancement the phase switch SW5 is changed over from the terminal d to e to stop the motor M as the trigger switch SW4 is already in the OFF state. For closing the shutter the second sequence selecting switch SW9 needs to be opened only for a short period required for the steps of rotation of motor M to open the switches SW7 and SW8, shutter closing and opening of the exposure completion switch SW2, and may be thereafter reclosed to prepare for the time exposure of the succeeding frame. Upon reclosure of the trigger switch SW4 the above-explained functions are repeated whereby the shutter is maintained open even after the trigger switch SW4 is opened and is closed upon turning OFF of the second sequence selecting switch to achieve the time exposure followed by film advancement. In this manner it is no longer necessary, in case of an exposure of an extended period, the maintain the trigger switch SW4 in the ON state throughout the exposure period as required in the fourth operating mode.

In the following there will be explained another embodiment of the present invention illustrated in FIG. 6, in which the same components as those in FIG. 1 are given the same numerals and are omitted from the following explanation.

Figure 6:
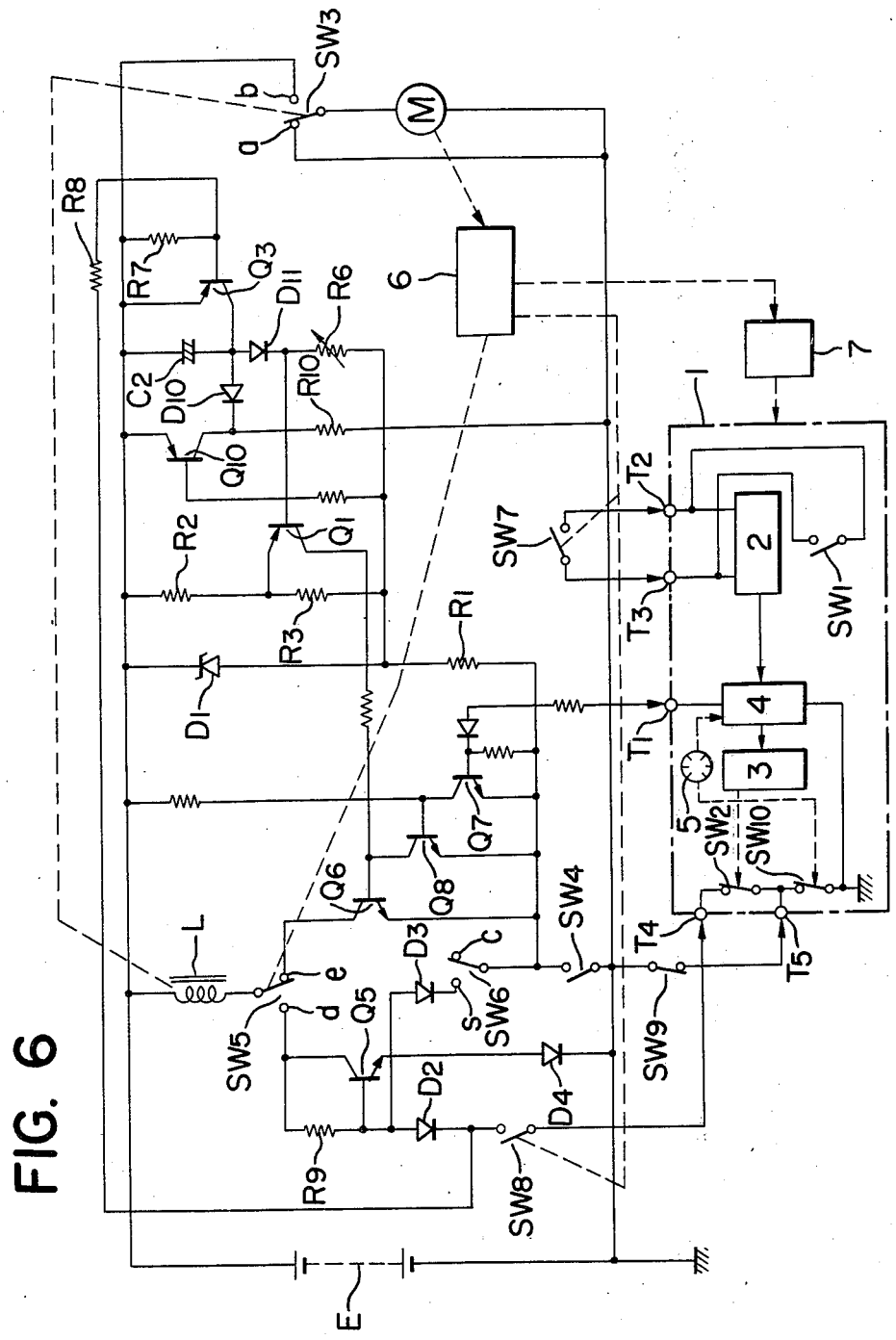
FIGS. 6–9 are circuits representing other embodiments of the present invention.

The embodiment shown in FIG. 6 is different from that in FIG. 1 in that, whereas the start circuit in FIG. 1 is structured to render the transistor Q2 conductive only for an instant upon closure of the trigger switch SW4 thereby immediately rendering the transistor Q1 conductive without any delay determined by the timer circuit, the start circuit in FIG. 6 is structured such that a capacitor C2 is charged while the trigger switch SW4 is open and renders the transistor Q1 conductive immediately upon closure of the trigger switch SW4.

Referring to FIG. 6, the capacitor C2 is charged through a diode D10 and a resistor R10 when the trigger switch SW4 is in the OFF state, or the motor drive apparatus is not functioning. A diode D11 for blocking reverse current is provided to block unnecessary current supply to the circuit of resistor R10 and diode D10 through the resistors R1, R2 and R3 or through the resistor R2 and base of transistor Q1, and also to compensate the fluctuation, of the timer period resulting from temperature-dependent variation of base-emitter voltage of the transistor Q1. The transistor Q10, being a PNP type, has no current through the base and collector thereof to the resistor R10 when the trigger switch SW4 is in the OFF state, and does not involve, therefore, unnecessary current consumption once the condenser C2 is charged during the stand-by period wherein the trigger switch SW4 is maintained open.

Upon closure of the trigger switch SW4, a Zener potential generated across the Zener diode D1 provide a forward bias to the transistor Q10 through a resistor connected to the base thereof thereby rendering the transistor conductive. Thus the diode D10, becoming biased backwards with the cathode thereof assuming a potential substantially equal to that of the positive pole of power source, shows no current therethrough, and the function of timer circuit thereafter is not affected by the capacitor C2. The capacitor C2, being charged to a potential higher than the activating level of the transistor Q1, renders, upon closure of the trigger switch SW4, the transistor Q1 conductive which in turn renders the transistor Q6 conductive to energize the relay coil L and to cause the rotation of motor M whereby the drive mechanism 6 releases the camera shutter. The turning OFF of the trigger switch SW4 renders the transistor Q10 non-conductive whereby the capacitor C2 is charged again through the diode D10 and resistor R10 to prepare for the next closure of the trigger switch SW4. Explanation of the operating modes will be omitted since the same operating modes as in the first embodiment can be achieved by suitably positioning the selecting switch SW6 and the first and second sequence selecting switches SW9, SW10 in the same manner as explained with respect to the first embodiment.

Figure 7:
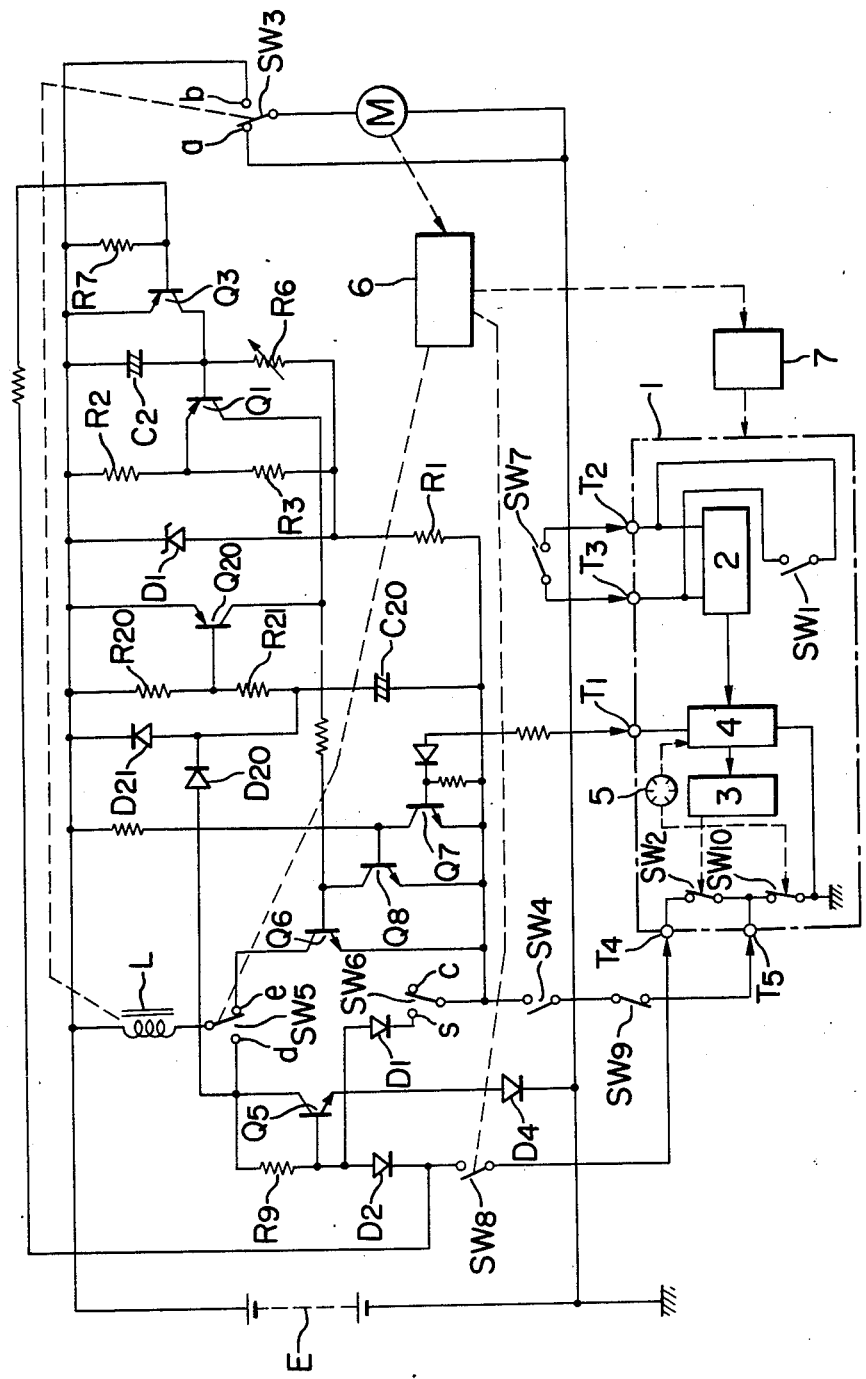

FIG. 7 shows a third embodiment of the present invention wherein a transistor Q20 is designed to provide the start signal upon closure of the trigger switch SW4, and the turning ON of the transistor renders the transistor Q6 conductive to cause the rotation of motor M thereby releasing the camera shutter. It is now assumed that the switches in the motor drive apparatus are positioned to perform the first operating mode as illustrated in FIG. 7. Upon closure of the trigger switch SW4 in this state, the transistor Q20 is rendered conductive by a charging current of a capacitor C20 through a resistor R21. As the result the transistor Q6 is rendered conductive to cause the rotation of motor M, whereby the switch SW7 is turned on to release the camera shutter and changing over the phase switch SW5 from the terminal e to d. The duration the conductive state of the transistor Q20 is substantially determined by the time constant of the capacitor Q20 and resistor R21 and is selected longer than a period required for the steps of closure of trigger switch SW4, shutter release by the motor rotation and changing over of the phase switch SW5 from the terminal e to d. Upon the changing over of the capacitor C20 is charged through the relay coil L and diode D20. Because of a sufficiently low resistance in the relay coil L, the capacitor C20 is charged within a short period to a level sufficient to shut off the transistor Q20 which is thereby rendered non-conductive. The transistor Q20 remains in the non-conductive state since there is no charging current in the capacitor C20 as long as the trigger switch SW4 is in the ON state. Upon the opening of the trigger switch SW4, the capacitor C20 is rapidly discharged through a discharge accelerating diode D21 and resistors R2, R3 and R1 to prepare for the reclosure of the trigger switch SW4. In the second operating mode wherein the selecting switch SW6 is positioned at the terminal c, the second sequence selecting switch SW9 is in the OFF position, the camera 1 is manually set for a high shutter speed and the first sequence selecting switch SW10 is in the OFF state as explained with respect to the first embodiment, the closure of trigger switch SW4 initiates the rotation of motor M whereby the shutter release is conducted and the phase switch SW5 is simultaneously changed from the terminal e to d. However the motor M continues to rotate since the transistor Q5 is not rendered non-conductive, to close the shutter after a predetermined period and conduct film advancement, upon the completion of which the phase switch SW5 is changed over from the terminal d to e. At this point the transistor Q6 should already be in conductive state for the following reason. In the circuit of FIG. 1, the capacitor C2 is instantaneously charged above a level rendering the transistor Q1 conductive upon closure of the trigger switch SW4, and is not discharged in the second operating mode to continuously maintain the transistor Q1 in the conductive state. On the other hand, in the circuit of FIG. 7, as the charging of capacitor C2 is initiated at the closure of trigger switch SW4, high-speed continuous photographing cannot be achieved unless the capacitor C2 is charged to the level enough for rendering the transistor Q1 conductive when the phase switch SW5 is changed over from the terminal d to e as otherwise the transistors Q1 and Q6 cannot be turned ON. For this reason, the time constant of the timer circuit is selected by means of the variable resistor R6 to satisfy the above-mentioned conditions. The functions in other operating modes are not explained in detail because they are obtained by appropriately positioning the selecting switch SW6, and the first and second sequence selecting switches SW9 and SW10 as explained with respect to FIG. 1.

Figure 8:
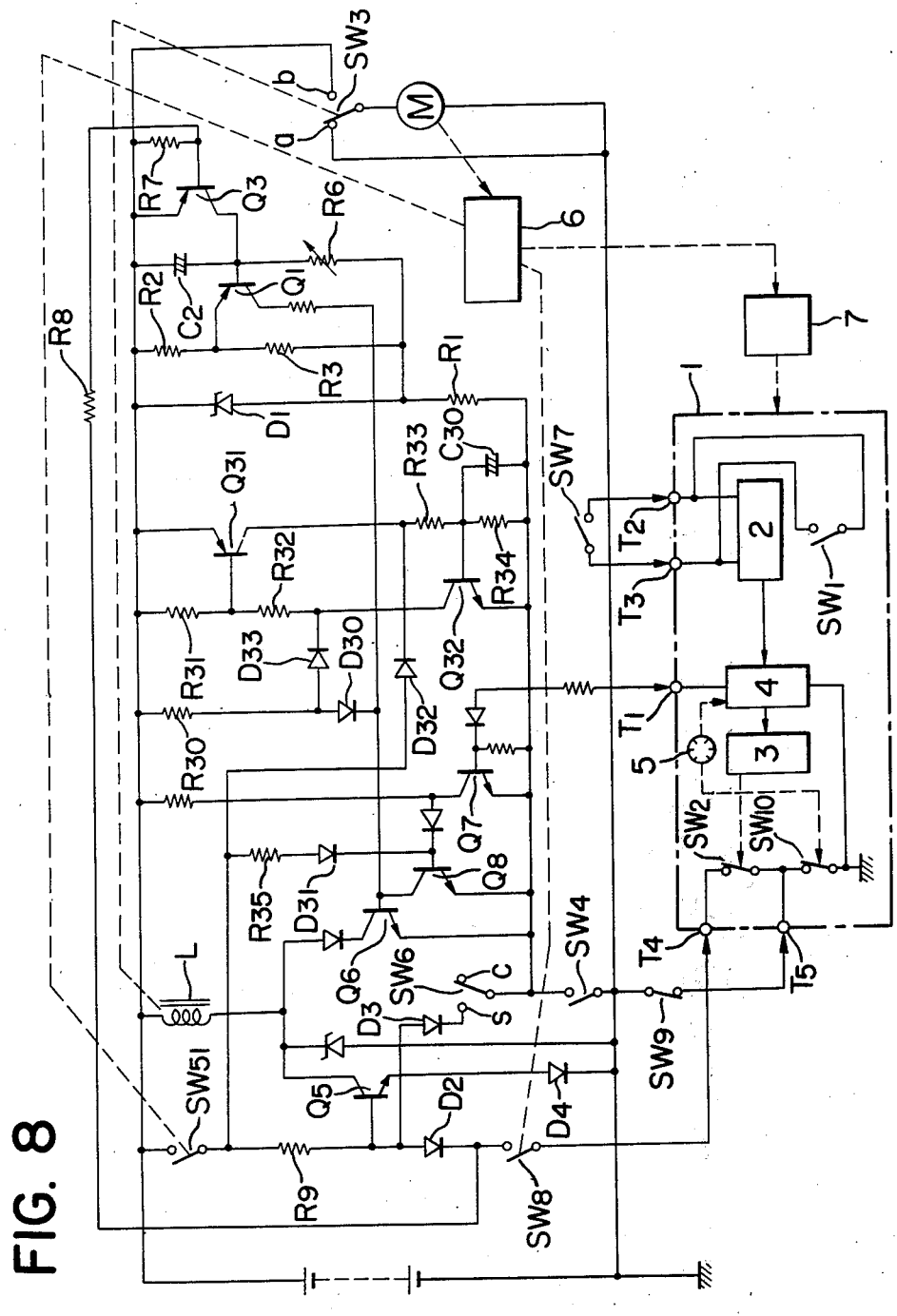

FIG. 8 shows a fourth embodiment of the present invention which differs from the foregoing embodiments in that a bistable circuit for starting the rotation of motor M for the shutter release upon closure of the trigger switch SW4 without the delay by the timer circuit, and in that the phase switch SW51 is composed of a simple on-off switch instead of change-over switch between the terminals e and d. The switch SW51 is turned ON simultaneously with the closure of the switch SW7 upon rotation of motor M and is turned OFF upon completion of the film advancement. The bistable circuit which functions as the start circuit is composed of transistors Q31, Q32, and resistors R32, R33. A capacitor C30 functions for preventing the erraneous operation resulting from noise.

In the first operating mode, upon closure of the trigger switch SW4, as the transistors Q31 and Q32 are maintained in OFF state, the transistor Q6 is biased conductive through the resistor R30 and diode D30 to energize the relay coil L, thereby causing the rotation of motor M to effect the shutter release and to close the phase switch SW51. Upon the turning ON of the phase switch SW51, the bistable circuit composed of the transistors, Q31, Q32 applies a bias through the phase switch SW51 and diode D32 to the transistor Q32 to render the transistor, conductive, whereby the transistor Q32 and Q31 are maintained in conductive state by means of positive feedback action as long as the trigger switch SW4 is in closed state. When the transistor Q32 assumes conductive state, the transistor Q6, of which bias is clamped by the diode D33, is not rendered conductive by the bias caused by the resistor R30. Also as the transistor Q8 is biased conductive through the phase switch SW51, resistor R35 and diode D31 when the switch SW51 is closed, the current to the relay coil L is solely governed by the on-off state of transistor Q5. Thus, as the transistor Q6 can be shut off regardless of the state of transistor Q1, the motor M stops when the transistor Q5 is shut off. The motor M starts rotation upon the turning on of the transistor Q5, and, upon completion of the film advancement, the phase switch SW51 is opened to shut off the transistor Q5. If the trigger switch SW4 is maintained closed, the transistor Q8 is shut off whereby the transistor Q6 is truned on simultaneously with the turning on of the transistor Q1 to perform the shutter release for the succeeding frame. Upon the opening of the trigger switch SW4, the transistors Q31, Q32 are reset of OFF state. The above-explained steps are repeated upon reclosure of the trigger switch SW4. In the second operating mode, the resistor R6 of the timer circuit, as explained in connection with the third operating mode of FIG. 7, should be adjusted to a value that will render the transistor Q1 conductive upon closure of the trigger switch SW4 before the phase switch SW51 is turned off. The functions of other operating modes are not explained in detail as they are achieved by appropriately positioning the selecting switch SW6 and the first and second sequence selecting switches SW9, SW10 as explained in connection with the circuit of FIG. 1.

Figure 9:
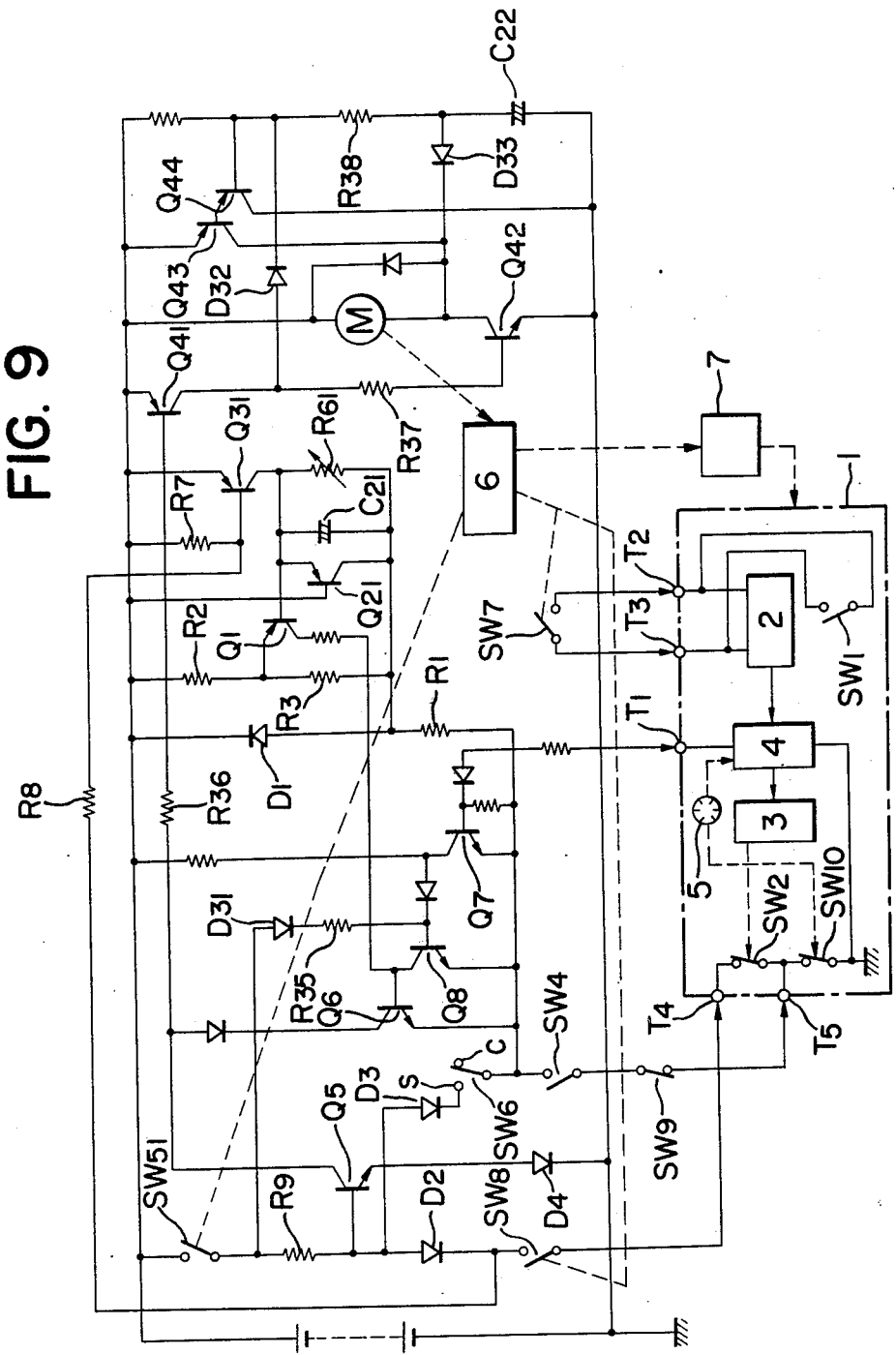

FIG. 9 shows a fifth embodiment of the present invention wherein the phase switch SW51 is structured, as in FIG. 8, to be closed simultaneously with the closure of switch SW7 upon rotation of motor M and to be opened upon completion of the film advancement. The transistors Q41, Q42, Q43, Q44, resistors R37, R38, capacitor C22 and diodes D32, D33 constitute a circuit for current feeding and electromagnetic braking for motor M, which circuit is composed by the relay coil L and switch SW3 in other embodiments. Upon the turning on of the transistor Q41, the transistor Q42 is turned on through the resistor R37 to supply current to the motor M and also to discharge the capacitor C22 through the diode D33 and transistor Q42. Also since the transistor Q41 is in conductive state, the transistors Q43 and Q44 are clamped in non-conductive state by means of the diode D32. When the transistor Q41 is turned off, the transistor Q42 is also shut off to interrupt the current to the motor M and also render the transistors Q43, Q44 conductive by the charging current for the capacitor C22 through the resistor R38. Thus the motor M is short-circuited through the transistor Q43, and is rapidly stopped by electromagnetic braking. The transistors Q43, Q44 are shifted to the non-conductive state upon completion of the charging of capacitor C22. The timer circuit and start circuit are composed of resistors R2, R3, R7, R8, R61, transistors Q1, Q21, Q31, and capacitor C21. While in the embodiment of FIG. 1 the transistor Q1 in the timer circuit is rendered conductive upon the charging of the capacitor C2, the transistor Q1 in the present embodiment is rendered conductive upon discharge of the capacitor C21. The function of the present embodiment is as follows.

Upon closure of the trigger switch SW4, as the capacitor C21 being in the discharged state, the transistor Q1 is shifted to conductive state to render the transistor Q6 conductive, whereby the transistor Q41 is rendered conductive through resistor R36 to cause the motor M to rotate. The transistor Q21, being inversely biased, remains in non-conductive state. The rotation of motor M turns on the switch SW7 to conduct shutter release and also closes the phase switch SW51. Thereupon the transistor Q8, being biased through the phase switch SW51, diode D31 and resistor R35, is shifted to the conductive state to render the transistor Q6 non-conductive. Thus the transistor Q41 is turned on according to the state of transistor Q5. In case of an operating mode wherein the transistor Q5 is non-conductive, for example the first operating mode, the transistor Q5 is maintained non-conductive while the transistor Q31 is maintained conductive until the completion of the exposure. When the transistor Q5 is shut off the transistor Q41 is likewise shut off to apply elechromagnetic braking to the motor M to hold the same in standstill. Also as the transistor Q31 is in conductive state until the completion of exposure, the capacitor C21 is immediately charged to a potential substantially equal to the voltage across the Zener diode D1 thereby shutting off the transistor Q1. Upon completion of the exposure the exposure completion switc SW2 is opened to render the transistor Q5 conductive thereby causing the rotation of motor M to effect the film advancement and shutting off the transistor Q31 to discharge the capacitor C21 through the resistor R61. Upon completion of the film advancement the phase switch SW51 is opened and the transistor Q5 is shut off. If the trigger switch SW4 is maintained in closed state, the transistor Q8 is shut off, and the transistor Q6 is rendered conductive since the transistor Q1 is in conductive state. When the voltage across the capacitor C21, being discharged through the resistor R61, is lowered to the level rendering the transistor Q1 conductive, the transistor Q1 therefore becomes conductive to render the transistor Q6 conductive thereby effecting shutter release for the succeeding frame. Upon the opening of the trigger switch SW4, the film advancement is completed and the phase switch SW51 is opened to stop the motor M and to apply a bias to the transistor Q21 by the retentive charge in the capacitor C21 applied through the resistors R2, R3. Thus the transistor Q21 is rendered conductive whereby the capacitor C21 is immediately discharged below the ON level for the transistor Q1 thereby preparing said transistor Q1 for next function for succeeding photograph taking upon reclosure of the trigger switch SW4. Other operating modes will not be explained in detail as they can be achieved by appropriately positioning the selecting switch SW6, and the first and second sequence selecting switches SW9, SW10 as explained in connection with FIG. 1.

In the foregoing explanation of FIGS. 1, 6, 7, 8 and 9 the selecting switch SW6 and the second sequence selecting switch SW9 are structured to be individually operable for achieving various operating modes, but it is also possible to provide the motor drive apparatus with a suitable member for selecting the operating modes, the member being structured, when pointing at a particular operating mode, to correspondingly make connections of the selecting switch SW6 and the second sequence selecting switch SW9. Also in the foregoing explanation, the shutter release of the camera 1 is electrically connected with the motor drive apparatus, but such connection can also be achieved by mechanical means for example a shutter release pin, and in such case it will be evident that the functions in the foregoing embodiments can be achieved if the shutter release pin is structured to close the switch SW8 when it is in a position to release the camera shutter and to open the switch SW8 when it is in a position not to release the shutter.

As explained in the foregoing the present invention allows, in the first operating mode thereof, to exactly determine the actual interval from the completion of exposure to the shutter release for the succeeding frame solely by the timer period and without the effect of variation in the film advancing time which is dependent on the power source voltage and load, as long as the timer period is selected to be greater than the period from the completion of exposure to film advancement. Also the present invention provides a motor drive apparatus allowing the selection of various operating modes.

We claim:

1. A motor drive apparatus for a camera for starting shutter release upon the turning on of a trigger switch, for starting film winding upon receipt of an exposure completion signal from said camera upon a completion of exposure and for generating a signal upon completion of film winding, comprising:
    (a) a timer circuit adapted to start counting elapsed time upon receipt of said exposure completion signal from the camera and to generate a timer signal after the lapse of a predetermined period; and
    (b) shutter release means adapted to generate a release signal and to start shutter release when said film winding completion signal is produced and said timer signal is generated.

2. A motor drive apparatus for a camera of the type in which an exposure completion signal is generated upon completion of exposure, and for effecting operations such as shutter releasing and film winding, comprising:
    (a) a trigger switch for actuating the motor drive apparatus;
    (b) release means for generating a release signal upon the turning on of said trigger switch to enable exposure;
    (c) phase detecting means adapted to assume a first state upon starting an exposure of the camera, to cause the film winding to be started upon receipt of said exposure completion signal in said first state and to assume a second state upon completion of said film winding to enable a succeeding shutter release;
    (d) a timer circuit adapted to start counting elapsed time upon receipt of said exposure completion signal and to terminate said counting and generate a timer signal after the lapse of a predetermined period; and
    (e) circuit means adapted to cause said release means to generate a release signal when said phase detecting means assumes said second state and said timer circuit generates said timer signal.

3. A motor drive apparatus according to claim 2, wherein said release means comprises:
    (a) a start circuit adapted to generate a start signal immediately upon the turning on of said trigger switch; and
    (b) a release circuit for producing a release signal upon receipt of said start signal when said phase detecting means assumes said second state.

4. A motor drive apparatus according to claim 3, wherein said circuit means includes a coupling line which connects an output terminal of said timer circuit and an output terminal of said start circuit to an input to said release circuit.

5. A motor drive apparatus according to claim 3, wherein said start circuit shifts said timer circuit to the time counting completion state upon the turning on of said trigger switch, and wherein said start signal provides said timer signal.

6. A motor drive apparatus according to claim 3, wherein said start circuit shifts said timer circuit to the time counting completion state upon the turning off of said trigger switch, and wherein said start signal provides said timer signal upon the turning on of said trigger switch.

7. A motor drive apparatus for a camera of the type in which an exposure completion signal is generated upon completion of exposure, and for effecting operations such as shutter release and film winding, comprising:
    (a) a trigger switch for actuating the motor drive apparatus;
    (b) release means for generating a release signal upon the turning on of said trigger switch to enable exposure;
    (c) phase detecting means adapted to assume a first state upon starting an exposure of the camera, to cause the film winding to be started upon receipt of said exposure completion signal in said first state and to assume a second state upon completion of said film winding to enable a succeeding shutter release;
    (d) a timer circuit adapted to start counting elapsed time upon receipt of said exposure completion signal and to terminate said counting and generate a timer signal after the lapse of a predetermined period;
    (e) circuit means adapted to cause said release means to generate a release signal when said phase detecting means assumes said second state and said timer circuit generates said timer signal;

(f) sequence selecting means adapted to determine whether the exposure completion signal from the camera is to be applied to said phase detecting means in said first state thereof and to said timer circuit; and (g) a selection switch adapted to select an operational state to inhibit film winding after exposure and while said trigger switch is ON.

8. A motor drive apparatus according to claim 7, wherein said selection switch is a switch connected in series with said trigger switch, and wherein the turning ON of said selection switch causes the turning OFF of the trigger switch to be effective as an an exposure completion signal.

* * * * *